(12) United States Patent
Maney et al.

(10) Patent No.: US 7,264,296 B1
(45) Date of Patent: Sep. 4, 2007

(54) FEED TRUCK COMPARTMENT LID CONTROL SYSTEM

(75) Inventors: Randy Maney, Cornelia, GA (US); Jerel McClain, Clarkesville, GA (US)

(73) Assignee: Fieldale Farms Corporation, Baldwin, GA (US)

( * ) Notice: Subject to any disclaimer, the term of this patent is extended or adjusted under 35 U.S.C. 154(b) by 248 days.

(21) Appl. No.: 11/168,082

(22) Filed: Jun. 28, 2005

(51) Int. Cl.
*B60P 7/02* (2006.01)

(52) U.S. Cl. ............................. 296/100.02; 296/100.1; 296/101; 105/377.09

(58) Field of Classification Search ........... 296/100.02, 296/100.03, 100.05, 101; 105/377.09, 377
See application file for complete search history.

(56) References Cited

U.S. PATENT DOCUMENTS

| | | | |
|---|---|---|---|
| 732,422 A | 6/1903 | Loos | |
| 1,374,292 A | 4/1921 | Farrand | |
| 1,454,883 A | 5/1923 | Denman et al. | |
| 2,408,132 A * | 9/1946 | Weeks | 296/100.1 |
| 2,487,993 A | 11/1949 | Tipton | |
| 2,547,859 A | 4/1951 | Duffie et al. | |
| 2,647,473 A | 8/1953 | Lunde | |
| 3,155,052 A | 11/1964 | Carney, Jr. | |
| 3,190,238 A * | 6/1965 | Carney, Jr. et al. | 105/377.09 |
| 3,250,233 A | 5/1966 | Carney, Jr. et al. | |
| 3,260,224 A | 7/1966 | Pettit et al. | |
| 3,476,042 A | 11/1969 | Carney, Jr. et al. | |
| 3,631,816 A * | 1/1972 | Miller | 105/377.05 |
| 3,760,743 A * | 9/1973 | Walk | 105/377.11 |
| 3,831,792 A * | 8/1974 | Waterman et al. | 105/377.05 |
| 4,210,358 A * | 7/1980 | Sweet et al. | 296/100.1 |
| 4,302,044 A * | 11/1981 | Sims | 296/100.1 |
| 4,368,674 A * | 1/1983 | Wiens et al. | 105/377.01 |
| 4,435,010 A * | 3/1984 | Mandel | 296/100.06 |
| 4,542,931 A * | 9/1985 | Walker, Jr. | 296/100.1 |
| 4,585,266 A * | 4/1986 | Steinberg | 296/100.1 |
| 4,627,658 A * | 12/1986 | Vold et al. | 296/100.1 |
| 4,655,004 A * | 4/1987 | Caillet | 49/280 |
| 4,767,152 A * | 8/1988 | Stluka et al. | 296/101 |
| 4,796,945 A | 1/1989 | Congdon | |
| 4,811,680 A * | 3/1989 | Genth | 114/201 R |
| 5,971,196 A * | 10/1999 | Gamache | 220/524 |
| 6,402,224 B1 * | 6/2002 | Monaco et al. | 296/100.1 |
| 6,435,594 B1 * | 8/2002 | Ekonen et al. | 296/100.09 |
| 6,983,975 B2 * | 1/2006 | Morrow | 296/100.1 |

* cited by examiner

*Primary Examiner*—Kiran B. Patel
(74) *Attorney, Agent, or Firm*—Myers & Kaplan, LLC; Ashish D. Patel, Esq.

(57) ABSTRACT

A feed truck compartment lid control system. The system includes coupled feed compartment lids on an upper surface of a feed truck trailer and includes cylinders in proximity of the lids such that the cylinders require much less force and power, and thus much less air pressure, to open and close the lids. The cylinder arms are connected directly to elongated bars that couple a plurality of feed compartment lids to one another. At least one of the lids includes wheels to allow the lids to travel across the upper surface of the feed truck trailer as they are opened and closed.

18 Claims, 8 Drawing Sheets

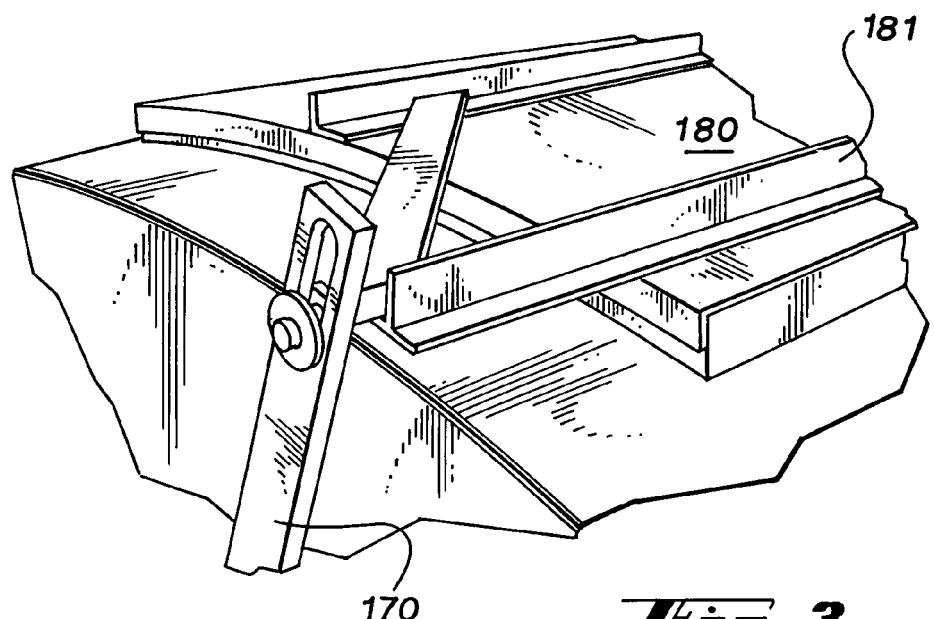
*Fig_3*
PRIOR ART
*Fig_4*
PRIOR ART
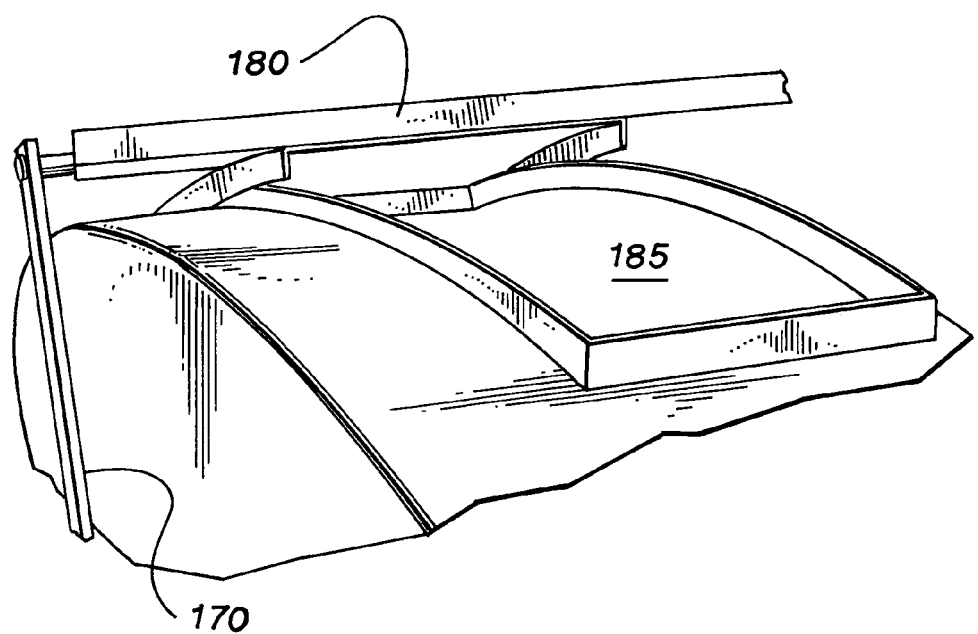

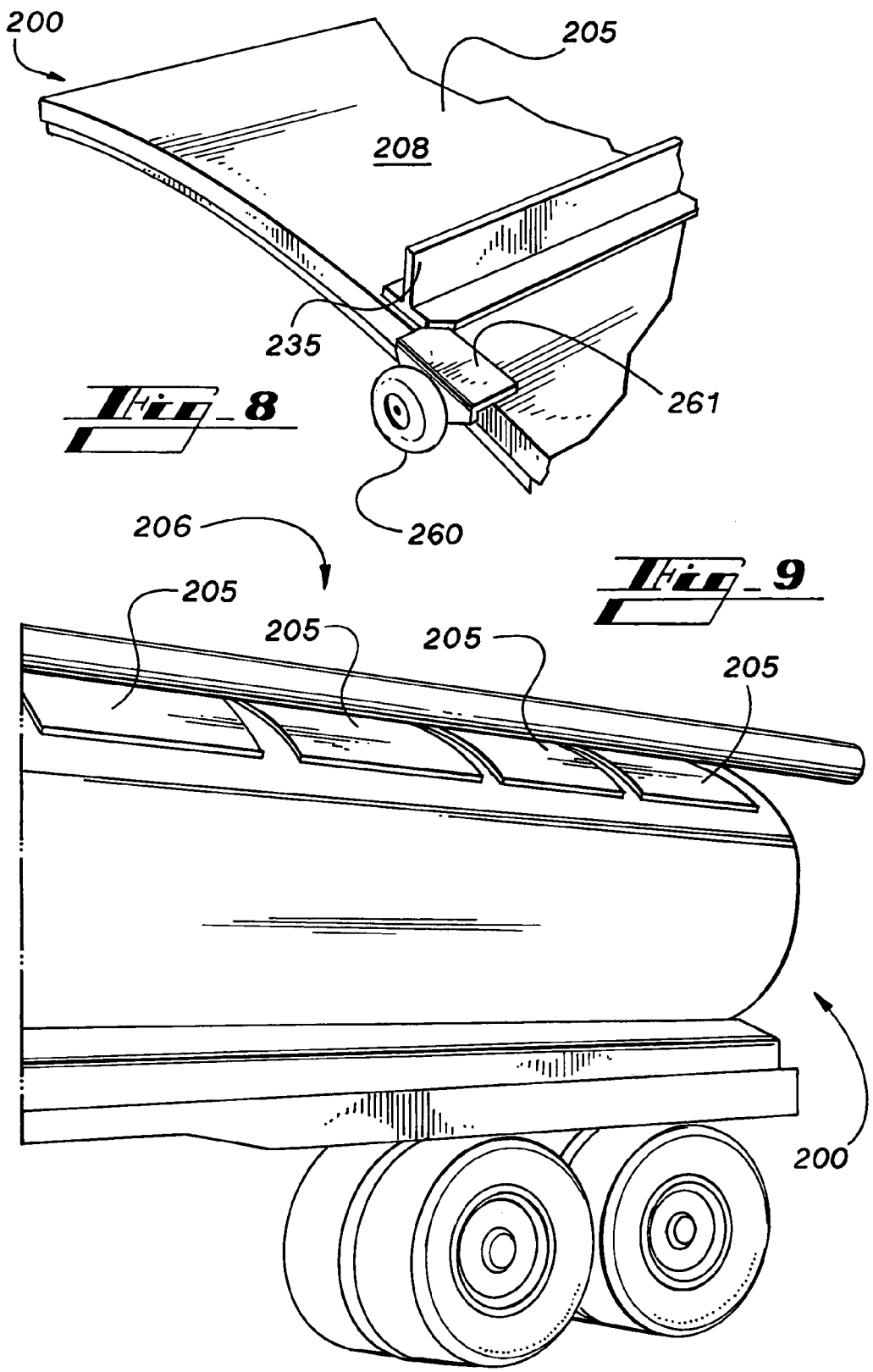

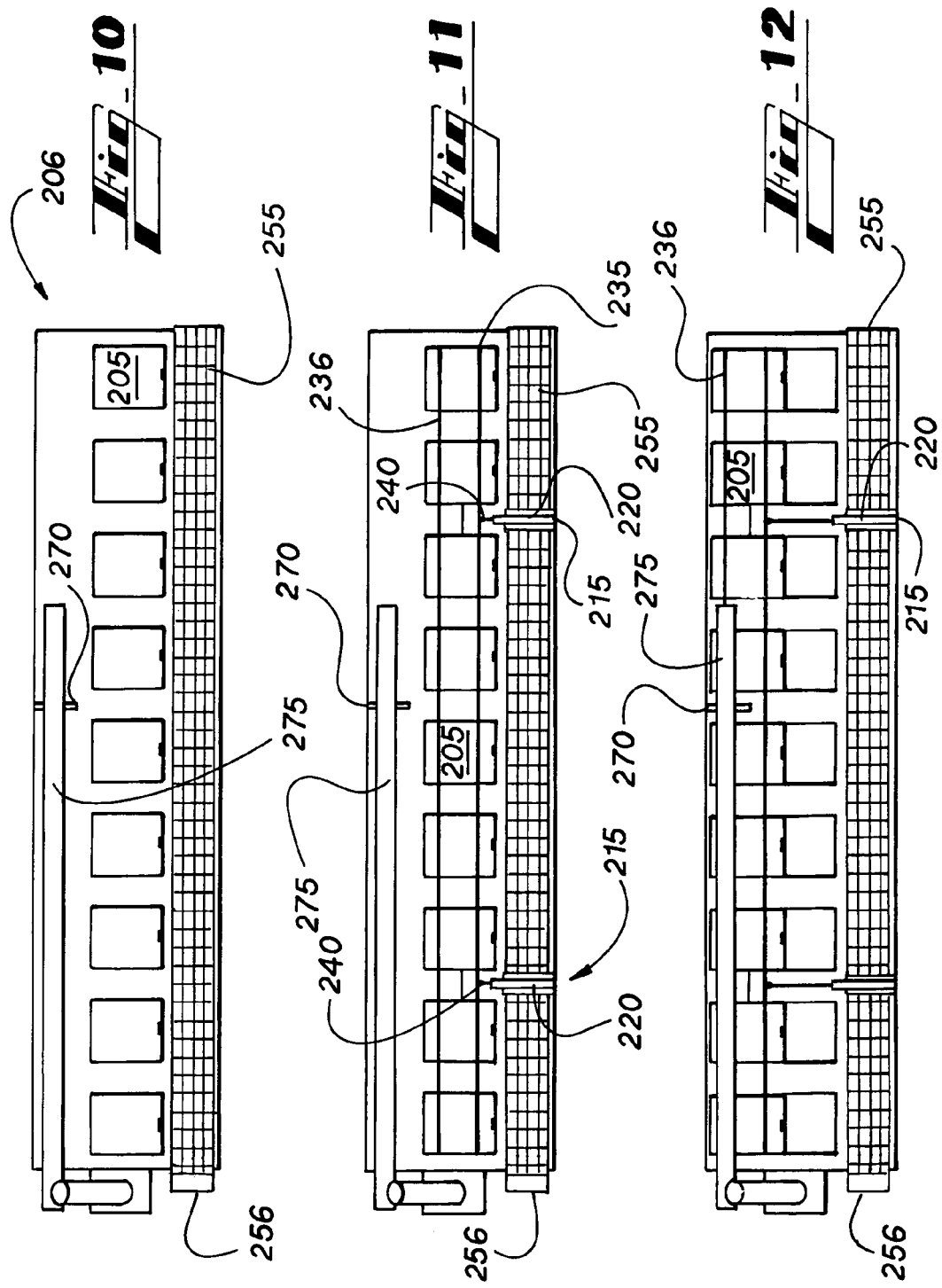

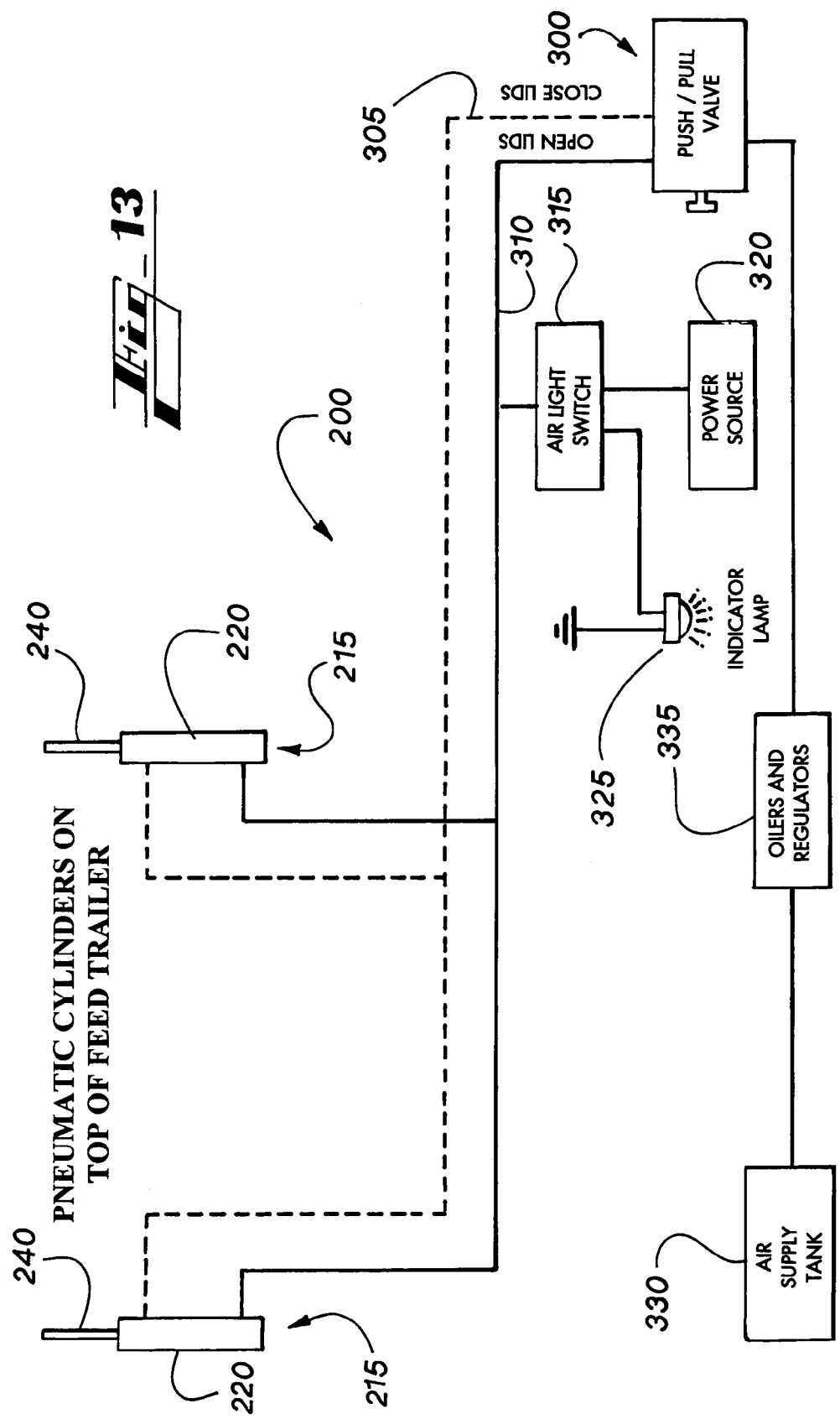

FEED TRUCK COMPARTMENT LID CONTROL SYSTEM

BACKGROUND

I. Field of the Invention

The present invention relates generally to the field feed trucks and more particularly to a feed truck compartment lid control system.

II. Description of the Related Art

Present feed trucks, typically used to transport large amounts of animal feed have long trailers with individual compartments, each compartment containing feed. Each of the compartment includes a lid. FIG. 1 illustrates a prior art feed truck 100 having a prior art air cylinder system 150. FIG. 2A illustrates a front view of a prior art feed truck air cylinder system in 150 a first, closed position. In general, the system 150 includes an air cylinder 160 having a retractable arm 165. The air cylinders 160 are connected to both the front and back of the feed truck trailer 100, generally parallel to the ground. The end of the arm 165 is pivotally connected to an end of a lever arm 170 that is pivotally connected to the ends of the truck 100 at pivot point 175 around which the lever arm 170 pivots as the arm 165 retracts and extends. The opposite end of the lever arm 170 is connected to a series of connected compartment lids 180 that cover a plurality of individual compartments 185 having feed 190. In the fully extended position, the lever arm 170 is positioned as shown, which positions the lids 180 in a closed position, that covers the compartments 185. FIG. 2B illustrates a front view of a prior art feed truck air cylinder system 150 in a second, open position. In this position, the cylinder arm 165 is fully retracted, which positioned the lever arm 170 as shown. In this position, the lids 180 are in an open position that exposes the compartments 185 that typically allows the feed 190 to be loaded into the compartments.

It is well known in the prior art that the feed truck trailers include several additional features such as transfer conduits to move the feed from the compartments to their final location. In addition, the truck trailer can include an auger to move the feed from the compartments to the transfer conduit.

The following two figures illustrate further views of the prior art air cylinder system 150. FIG. 3 illustrates a close-up perspective view of a prior art feed truck air cylinder system 150 with a feed compartment lid 180 in a closed position. FIG. 4 illustrates a close-up perspective view of a prior art feed truck air cylinder system 150 with a feed compartment lid 180 in an open position. The figures generally illustrate that an elongated bar 181 couples a plurality of lids 180 to one another.

As mentioned above, the lids 180 of the individual compartments 185 are coupled to each other so that they can all be opened by using the air cylinder system 150. Therefore, when opening and closing the lids 180, the two lever arms 170 move through a large arc as shown by arrow A to open and close the lids 180. This large arc A requires a large air pressure force in the cylinders 160 and generally results in a shaky and awkward opening and closing of the lids 180.

SUMMARY

In general, the invention features a system for opening and closing lids on feed trucks. The present invention couple the lids together on top of the trailer and places the cylinders in proximity of the lids such that the cylinders require much less force and power, and thus much less air pressure, to open and close the lids. The prior art arms are removed, so there is no further need for the opening and closing mechanism to move through a large arc. The cylinder arms are connected directly to elongated bars that couple a plurality of feed compartment lids to one another. At least one of the lids includes wheels to allow the lids to travel across the upper surface of the feed truck trailer as they are opened and closed.

In general, in one aspect, the invention features a feed truck compartment lid control system, including at least one air cylinder having a cylinder body, at least one feed compartment lid having an upper surface, a first elongated bar connected to the upper surface of the feed compartment lid and a cylinder arm having a first end that is connected generally perpendicular to the elongated bar and a second end that extends and retracts into and from the cylinder body.

In one implementation, the system further includes a push/pull valve coupled to the cylinder body for extending and retracting the cylinder arm, thereby opening and closing the compartment lid.

In another implementation, the system further includes an end bar in pivotal engagement with prongs, the end bar and prongs combination being located between the cylinder arm and the elongated bar.

In another implementation, the end bar is connected to the cylinder arm and the prongs are connected to the elongated bar.

In another implementation, the end bar is connected to the elongated bar and the prongs are connected to the cylinder arm.

In another implementation, the system further includes an a second elongated bar connected to the lid and generally parallel to the first elongated bar.

In another implementation, the first elongated bar includes continuity breaks.

In another implementation, the second elongated bar includes continuity breaks.

In another aspect, the invention features a feed truck compartment lid control system for placement on a top surface of a feed truck trailer having a series of feed compartments, the system including at least one air cylinder having a cylinder body being connected to the top surface, at least one feed compartment lid for covering one of the feed compartments, the lid having an upper surface, a first elongated bar connected to the upper surface of the feed compartment lid and a cylinder arm having a first end that is connected generally perpendicular to the elongated bar and a second end that extends and retracts into and from the cylinder body.

In one implementation, the system further includes a cylinder base to which the cylinder is pivotally connected.

In another implementation, the system further includes a collar connected to be base and spaced from the pivotal connection of the cylinder body to the base, the collar surrounding and thereby restricting movement of the cylinder body.

In another implementation, the cylinder body moves through angles less than ninety degrees when the lids open and close.

In another implementation, the system further includes a prong end bar combination connected between the cylinder arm and the first elongated bar, the prong end bar combination pivotally connecting the cylinder arm and the first elongated bar.

In another implementation, the end bar and the prong pivot with respect to each other through angles of less than ninety degrees.

In another implementation, the system further includes a wheel base connected to the lid and a wheel connected to the wheel base, thereby allowing the lid to travel along the surface of the feed truck trailer.

In another implementation, the lids travel along an arc as defined by the surface of the feed truck trailer.

In another implementation, the end of the cylinder arm moves in a direction as defined generally by a curvature of the surface of the feed truck trailer.

In another aspect, the invention features a feed truck trailer feed compartment lid movement system, including an air cylinder having a cylinder body and a cylinder arm, a feed compartment lid having an upper surface, means for connecting the cylinder arm to the feed compartment lid, the means for connecting being pivotal through angles of less than ninety degrees and means for opening and closing the lids along a curvature as defined by a curvature of a top surface of the feed truck trailer, the means for opening and closing being pivotally connected to the top surface.

One advantage of the invention is that awkward lever arms are not required to open and close feed compartment lids.

Another advantage of the invention is that less air pressure is required to open and close the feed compartment lids.

Another advantage of the invention is that air cylinders are removed from the front and back of the trailer.

Other objects, advantages and capabilities of the invention are apparent from the following description taken in conjunction with the accompanying drawings showing the preferred embodiment of the invention.

BRIEF DESCRIPTION OF THE DRAWINGS

FIG. 3 illustrates a close-up perspective view of a prior art feed truck air cylinder system with a feed compartment lid in a closed position;

FIG. 4 illustrates a close-up perspective view of a prior art feed truck air cylinder system with a feed compartment lid in an open position;

FIG. 8 illustrates a close-up perspective view of a component of an embodiment of a feed truck compartment lid control system;

FIG. 9 illustrates a side perspective view of a feed truck having an embodiment of a feed truck compartment lid control system;

FIG. 10 illustrates a top view of a feed truck having a series of feed compartment lids;

FIG. 11 illustrates a top view of a feed truck having an embodiment of a feed truck compartment lid control system in a closed position;

FIG. 12 illustrates a top view of a feed truck having an embodiment of a feed truck compartment lid control system in an open position; and FIG. 13 illustrates a system level diagram of an embodiment of a feed truck compartment lid control system.

DETAILED DESCRIPTION

Figure 1:
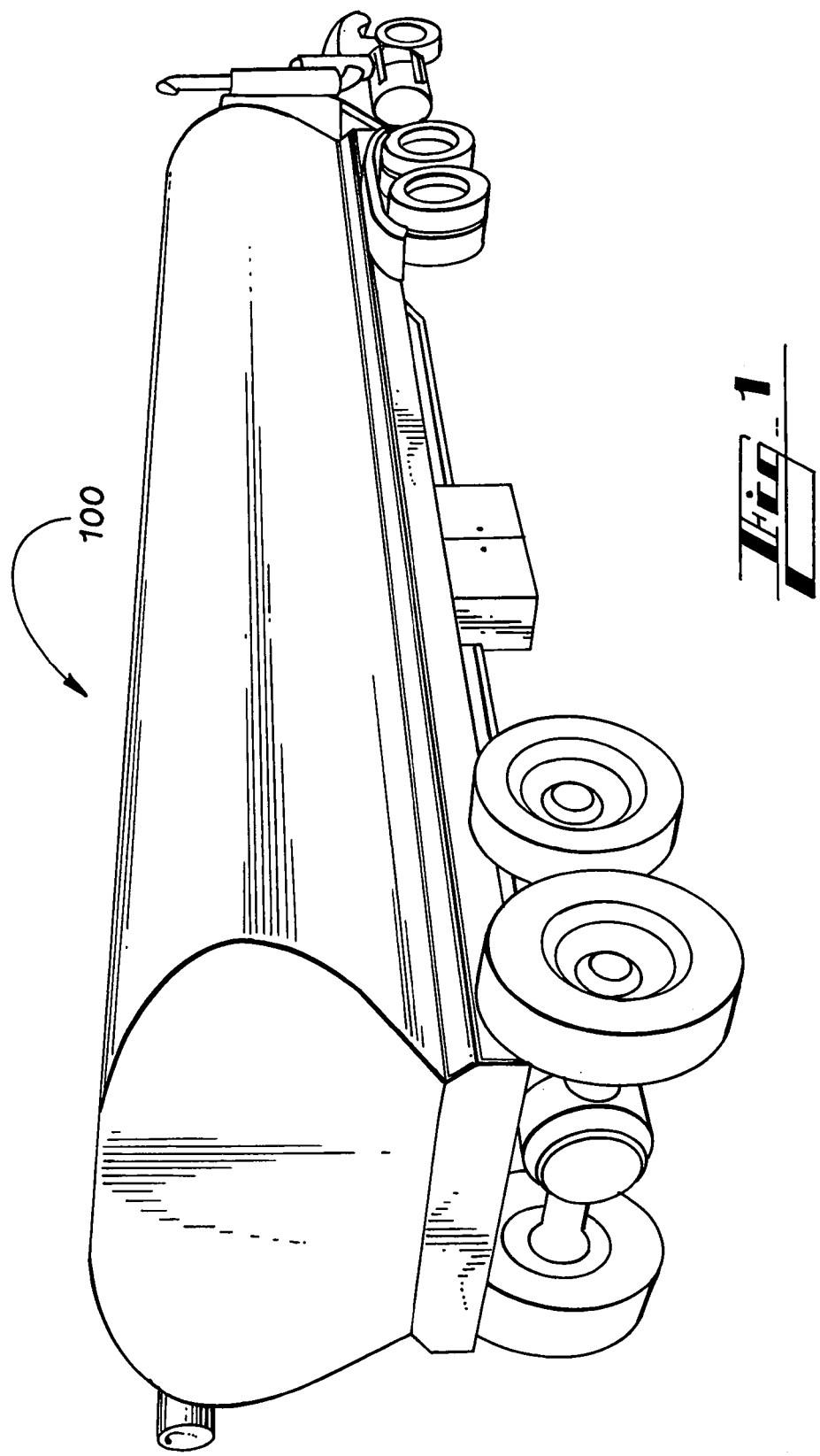
FIG. 1 illustrates a prior art feed truck having a prior art air cylinder system.
Figure 2A:
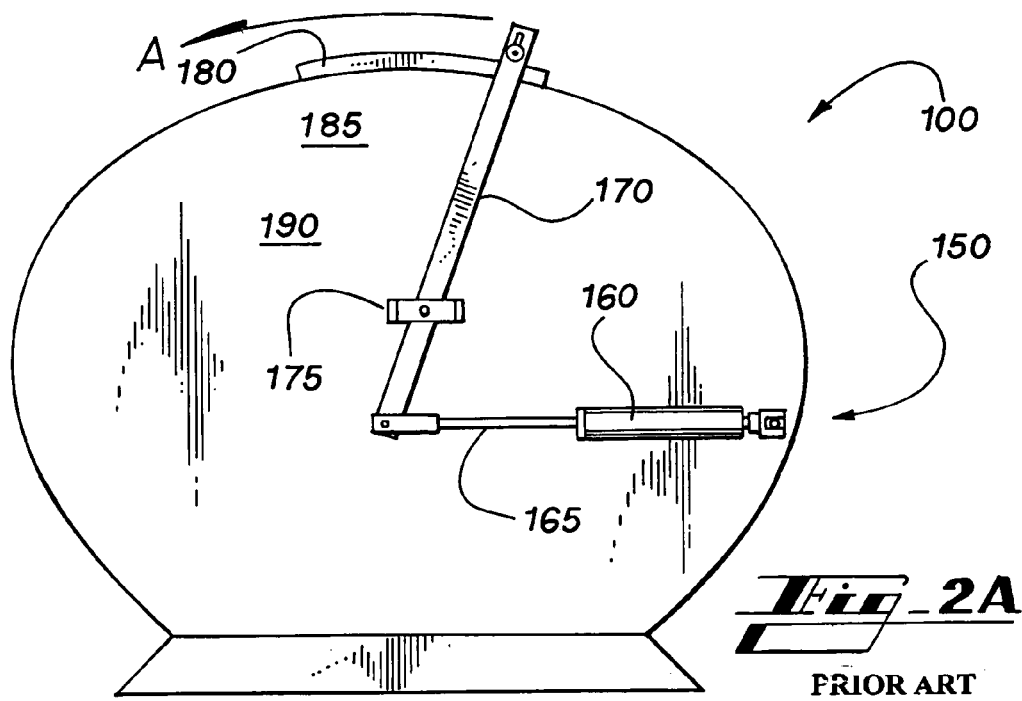
FIG. 2A illustrates a front view of a prior art feed truck air cylinder system in a first position.
Figure 2B:
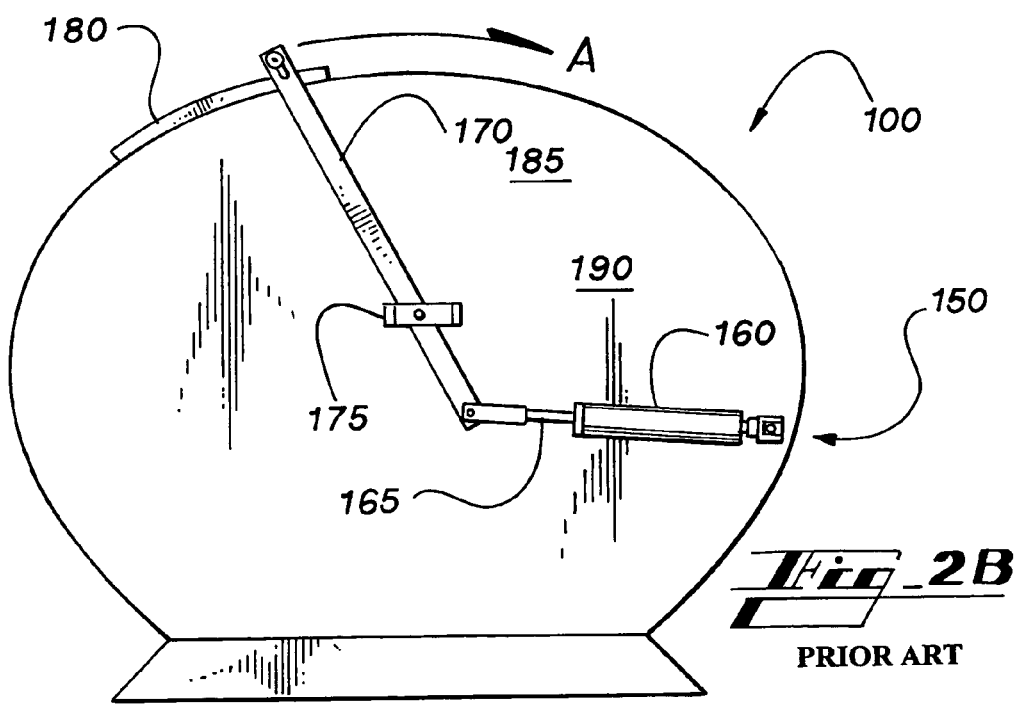
FIG. 2B illustrates a front view of a prior art feed truck air cylinder system in a second position.
Figure 5:
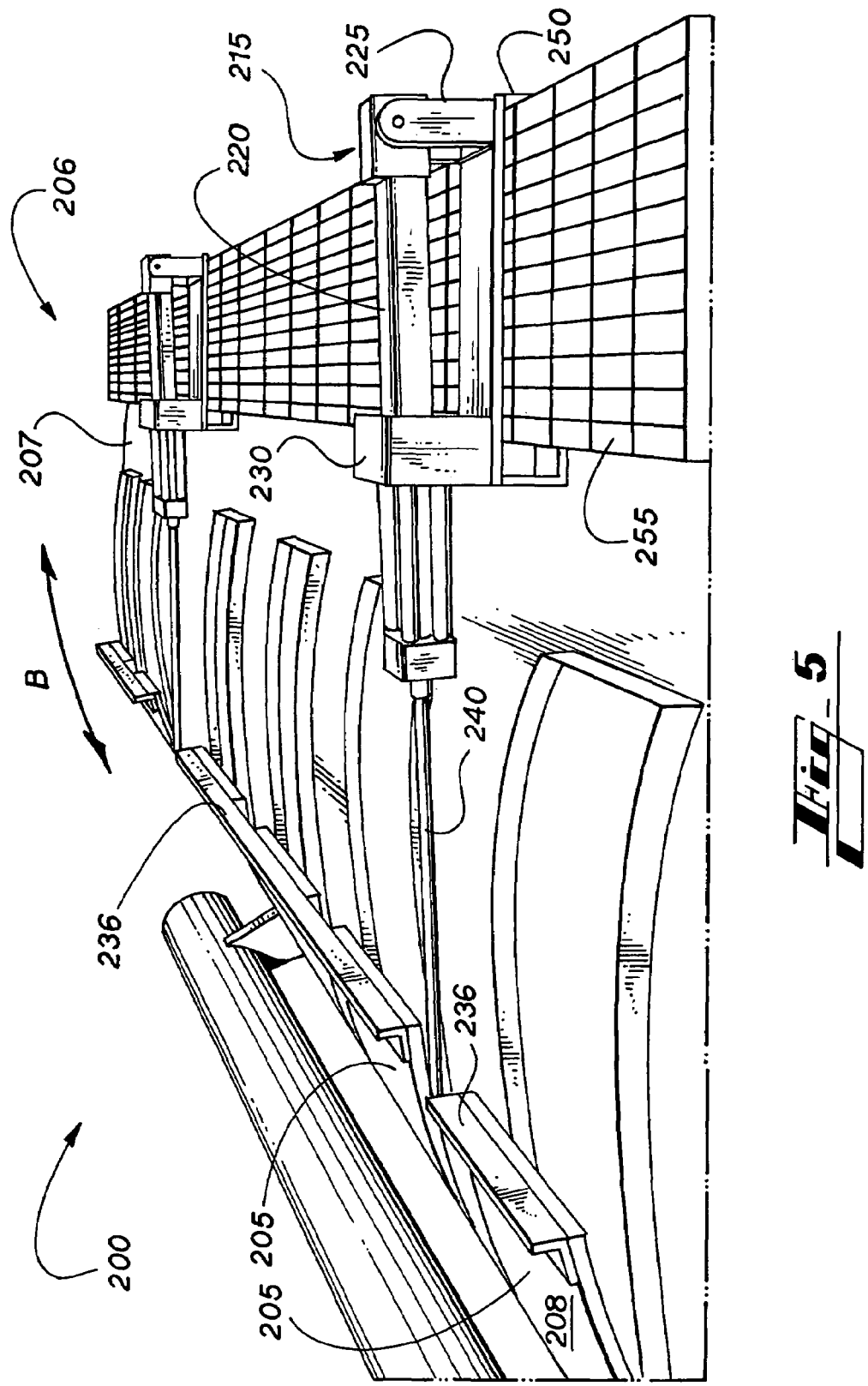
FIG. 5 illustrates a perspective view of an embodiment of a feed truck compartment lid control system with a feed compartment lid in an open position.

Referring to the drawings wherein like reference numerals designate corresponding parts throughout the several figures, reference is made first to FIG. 5 that illustrates a perspective view of an embodiment of a feed truck compartment lid control system 200 with a feed compartment lid 205 in an open position. The lid 205 is for covering the various feed compartments 210 located within the feed truck trailer 206. In general, the system 200 further includes at least one air cylinder 215 having a cylinder body 220. The cylinder body 220 is typically pivotally connected to an upper surface 207 of the feed truck trailer 206 at a pivot point 225. The cylinder body 220 typically only moves through small angles and greater movement beyond small angles is typically inhibited by a collar 230. In typical operation, no movement past the collar 230 is contemplated.

The feed compartment lid 205 typically has an upper surface 208 onto which an elongated bar 235 is connected. The elongated bar 235 is better illustrated in the figures below. The system 200 further includes a cylinder arm 240 having a first end 241 connected to the elongated bar 235. A second end 242 of the cylinder arm 240 is connected to the cylinder body 220. The cylinder arm 235 extends and retracts into and from the cylinder body 220. In the discussion of the prior art, two elongated bars are described that generally contribute to the coupling of the feed compartment lids. In an embodiment, the elongated bar 235 is parallel to a non-continuous elongated bar 236, which includes several breaks in the continuity to allow clearance for the cylinder arms 240 as the lids open and close during operation.

The system 200 further includes a cylinder base 250 connected to the surface 207 of the feed truck trailer 206. The pivot point 225 and the collar 230 are connected to the base 250 as spaced as illustrated. In general, as with typical feed trucks, a walkway 255 is connected to the surface 207 of the feed truck trailer 206. One or more of the bases 250 typically surround a portion of the walkway 255.

In general, the feed truck lid 205 is curved to accommodate the curvature of the feed truck trailer 206. As such, as the lid 205 opens and closes it travels along an arc as defined as defined by arrow B. It is therefore appreciated that as the lid 205 travels along the arc B, the cylinder 215 makes small upward and downward movements and therefore pivots about the pivot point 225 through small angles as mentioned above. It is further appreciated that the collar 230 further inhibits movement beyond the small angles, although this movement is typically not contemplated in normal operation.

Figure 6:
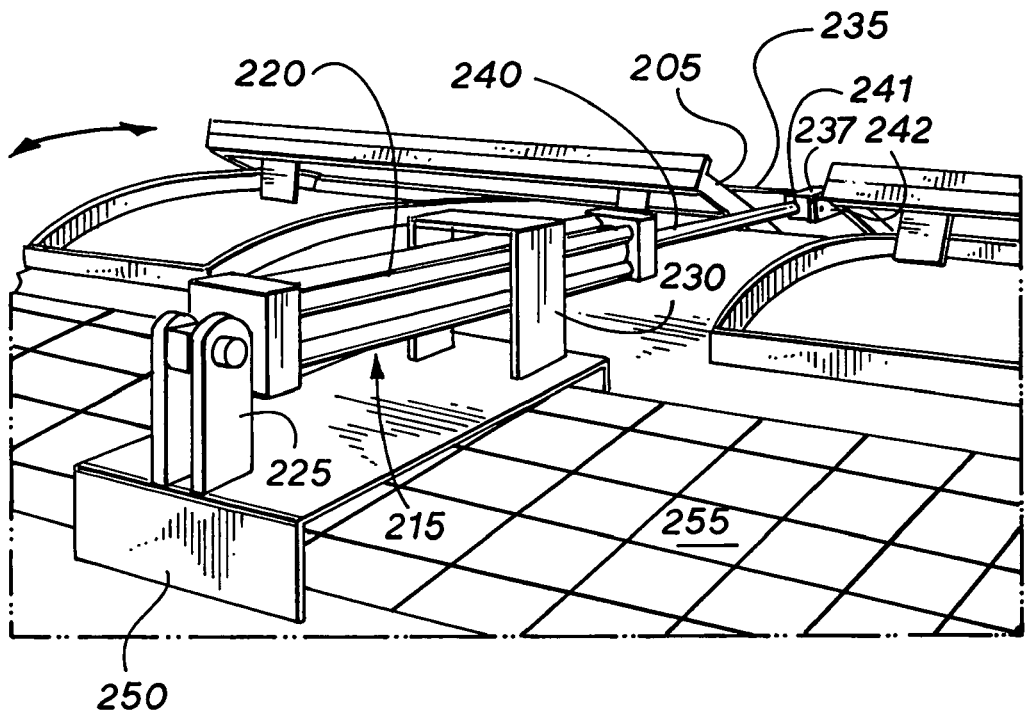
FIG. 6 illustrates another perspective view of an embodiment of a feed truck compartment lid control system with a feed compartment lid in an open position.
Figure 7:
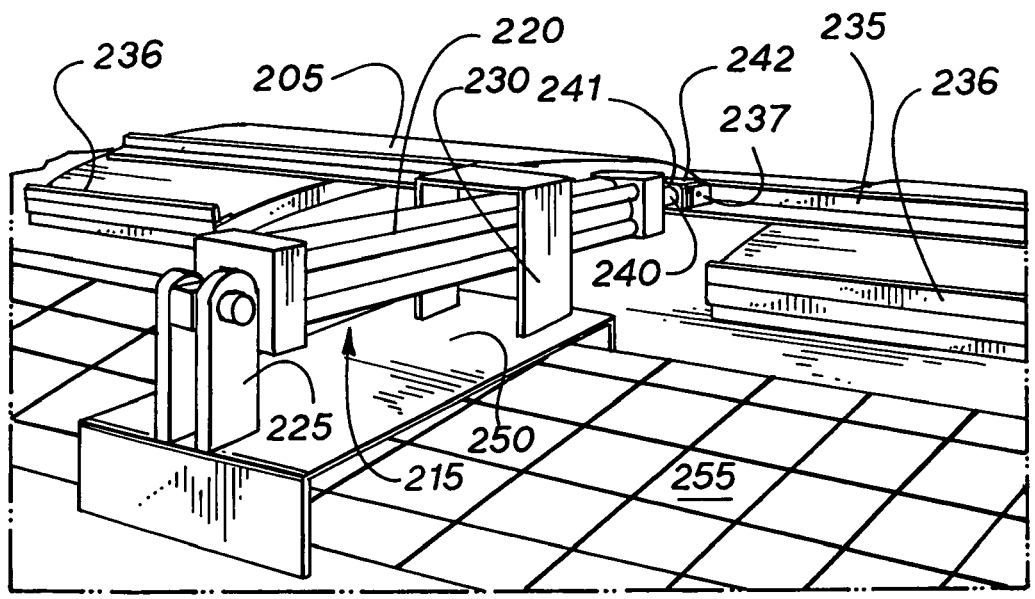
FIG. 7 illustrates another perspective view of an embodiment of a feed truck compartment lid control system with a feed compartment lid in a closed position.

FIG. 6 illustrates another perspective view of an embodiment of a feed truck compartment lid control system 200 with a feed compartment lid 205 in an open position. FIG. 7 illustrates another perspective view of an embodiment of a feed truck compartment lid control system 200 with a feed compartment lid 205 in a closed position. As described above, the system 200 includes at lease one feed compartment lid 205, at least one air cylinder 215 having a cylinder body 220, typically being pivotally connected to an upper surface 207 of the feed truck trailer 206 at a pivot point 225, spaced near the collar 230 on base 250. The elongated bar 235 is connected to the upper surface 208. The system 200 further includes a cylinder arm 240 having a first end 241 connected to the elongated bar 235. The second end 242 of the cylinder arm 240 is connected to the cylinder body 220. The elongated bar 235 is parallel to a non-continuous elongated bar 236, which includes several breaks in the continuity to allow clearance for the cylinder arms 240 as the lids open and close during operation. The system further includes the walkway 255.

FIGS. 6 & 7 illustrate the connection point between the arm 240 and elongated bar 235. In general, the connection point is pivotal. In a typical embodiment, an end bar 242 is connected to the second end 242 of the cylinder arm 240, which is, in turn, connected to a two prongs 237 that are connected to the elongated bar 235. In this way, the end bar 242 can pivot between the prongs 237 as the lids are opened and closed.

As further described above, as the lid 205 opens and closes it travels along an arc as defined as defined by arrow B. It is therefore appreciated that as the lid 205 travels along the arc B, the cylinder 215 makes small upward and downward movements and therefore pivots about the pivot point 225 through small angles as mentioned above. In addition, as just described, the bar 242 only makes small pivotal movements during operation. In general, it is further appreciated that any given point of the cylinder arm moves along an arc as Therefore, it is appreciated that far less air pressure and force is required by the cylinders 215 during operation, due to the drastically decreased movements as advantageously described in the embodiments.

FIG. 8 illustrates a close-up perspective view of a component of an embodiment of a feed truck compartment lid control system 200. This view illustrates a portion of the lid 205 having the elongated bar 235 attached to the surface 208. Furthermore, this view illustrates one of the outer-most lids, in which a wheel 260 and wheel base 261 are connected to the surface 208 adjacent the end of the elongated bar 235. The wheel 260 allows the coupled lids 205 to travel with reduced friction as the lids 205 open and close. IT is understood that additional wheels can be placed at various locations on the lids and bars as needed for ease of travel during operation.

FIG. 9 illustrates a side perspective view of a feed truck trailer 206 having an embodiment of a feed truck compartment lid control system 200. The view illustrates the lids 205 in an open position.

FIG. 10 illustrates a top view of a feed truck trailer 206 having a series of feed compartment lids 205 in a closed position. The system 200 is not shown simply for illustrative purposes.

FIG. 11 illustrates a top view of a feed truck having an alternate embodiment of a feed truck compartment lid control system 200 in a closed position. As described above, the system 200 includes at lease one feed compartment lid 205, at least one air cylinder 215 having a cylinder body 220, typically being pivotally connected to an upper surface 207 of the feed truck trailer 206 at a pivot point 225 on base 250. The elongated bar 235 is connected to the upper surface 208. The system 200 further includes a cylinder arm 240 having a first end 241 connected to the elongated bar 235. In this embodiment, the elongated arm 235 is positioned closer to the cylinder 215 and has changed places with the broken elongated arm 236. In this way, the elongated bar 235 to which the cylinder arms 240 are connected have increased stability by being connected to a bar with no breaks in it. The second end 242 of the cylinder arm 240 is connected to the cylinder body 220. The elongated bar 235 is parallel to a non-continuous elongated bar 236, which includes several breaks in the continuity to allow clearance for other components of the feed truck trailer 206 such as the connection point 270 for the feed tube 275. The system 200 further includes the walkway 255 and a ladder 256 to access the walkway 255. The embodiment further illustrates the absence of the collar 230.

FIG. 12 illustrates a top view of a feed truck having an embodiment of a feed truck compartment lid control system 200 in an open position. As described above, the system 200 includes at lease one feed compartment lid 205, at least one air cylinder 215 having a cylinder body 220, typically being pivotally connected to an upper surface 207 of the feed truck trailer 206 at a pivot point 225 on base 250. The elongated bar 235 is connected to the upper surface 208. The system 200 further includes a cylinder arm 240 having a first end 241 connected to the elongated bar 235. The second end 242 of the cylinder arm 240 is connected to the cylinder body 220. The elongated bar 235 is parallel to a non-continuous elongated bar 236, which includes several breaks in the continuity to allow clearance for other components of the feed truck trailer 206 such as the connection point 270 for the feed tube 275. The system 200 further includes the walkway 255 and a ladder 256 to access the walkway 255. The embodiment further illustrates the absence of the collar 230.

FIG. 13 illustrates a system level diagram of an embodiment of a feed truck compartment lid control system 200. In general, as described above, the system 200 includes the cylinders 215 having a cylinder body 220 and cylinder arm 240. The cylinders 200 are coupled to a push/pull valve 300 via pressure lines 305 to close the lids 205 and pressure lines 310 to open the lids 205. It is understood that the cylinders 215 can be coupled to the valve 300 in a variety of ways that extend and retract the cylinder arms 240. The system 200 generally further includes an air light switch 315, power source 320 and indicator lamp 325. Furthermore, an air supply tank 330 and oiler and regulators 335 are generally coupled to the valve 300. The system 200 can optionally be controlled advantageously by any number of micro-controllers or microprocessors with instructions in firmware or similar medium as needed.

The software techniques and methods discussed above can be implemented in digital electronic circuitry, or in computer hardware, firmware (as discussed), software, or in combinations of them. Apparatus may be implemented in a computer program product tangibly embodied in a machine-readable storage device for execution by a programmable processor; and methods may be performed by a programmable processor executing a program of instructions to perform functions by operating on input data and generating output. Further embodiments may advantageously be implemented in one or more computer programs that are executable on a programmable system including at least one programmable processor coupled to receive data and instructions from, and transmit data and instructions, to a data storage system, at least one input device, and at least one output device. Each computer program may be implemented in machine language or assembly language which can be assembled or translated, or a high level procedural or object-oriented programming language, which can be complied or interpreted. Suitable processors include, by way of example, both general and special purpose microprocessors. Generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed application specific integrated circuits (ASICs).

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A feed truck compartment lid control system, comprising:
   at least one air cylinder having a cylinder body;
   at least one feed compartment lid having an upper surface;
   a first elongated bar connected to the upper surface of the feed compartment lid; and
   a cylinder arm having a first end that is connected generally perpendicular to the elongated bar and a second end that extends and retracts into and from the cylinder body.

2. The system as claimed in claim 1 further comprising a push/pull valve coupled to the cylinder body for extending and retracting the cylinder arm, thereby opening and closing the compartment lid.

3. The system as claimed in claim 1 further comprising an end bar in pivotal engagement with prongs, the end bar and prongs combination being located between the cylinder arm and the elongated bar.

4. The system as claimed in claim 3 wherein the end bar is connected to the cylinder arm and the prongs are connected to the elongated bar.

5. The system as claimed in claim 3 wherein the end bar is connected to the elongated bar and the prongs are connected to the cylinder arm.

6. The system as claimed in claim 1 further comprising an a second elongated bar connected to the lid and generally parallel to the first elongated bar.

7. The system as claimed in claim 6 wherein the first elongated bar includes continuity breaks.

8. The system as claimed in claim 6 wherein the second elongated bar includes continuity breaks.

9. A feed truck compartment lid control system for placement on a top surface of a feed truck trailer having a series of feed compartments, the system comprising:
   at least one air cylinder having a cylinder body being connected to the top surface;
   at least one feed compartment lid for covering one of the feed compartments, the lid having an upper surface;
   a first elongated bar connected to the upper surface of the feed compartment lid; and
   a cylinder arm having a first end that is connected generally perpendicular to the elongated bar and a second end that extends and retracts into and from the cylinder body.

10. The system as claimed in claim 9 further comprising a cylinder base to which the cylinder is pivotally connected.

11. The system as claimed in claim 10 further comprising a collar connected to be base and spaced from the pivotal connection of the cylinder body to the base, the collar surrounding and thereby restricting movement of the cylinder body.

12. The system as claimed in claim 10 wherein the cylinder body moves through angles less than ninety degrees when the lids open and close.

13. The system as claimed in claim 9 further comprising a prong end bar combination connected between the cylinder arm and the first elongated bar, the prong end bar combination pivotally connecting the cylinder arm and the first elongated bar.

14. The system as claimed in claim 13 wherein the end bar and the prong pivot with respect to each other through angles of less than ninety degrees.

15. The system as claimed in claim 9 further comprising a wheel base connected to the lid and a wheel connected to the wheel base, thereby allowing the lid to travel along the surface of the feed truck trailer.

16. The system as claimed in claim 15 wherein the lids travel along an arc as defined by the surface of the feed truck trailer.

17. The system as claimed in claim 9 wherein the end of the cylinder arm moves in a direction as defined generally by a curvature of the surface of the feed truck trailer.

18. A feed truck trailer feed compartment lid movement system, comprising:
   an air cylinder having a cylinder body and a cylinder arm;
   a feed compartment lid having an upper surface;
   means for connecting the cylinder arm to the feed compartment lid, the means for connecting being pivotal through angles of less than ninety degrees; and
   means for opening and closing the lids along a curvature as defined by a curvature of a top surface of the feed truck trailer, the means for opening and closing being pivotally connected to the top surface.

* * * * *